Figure 1:
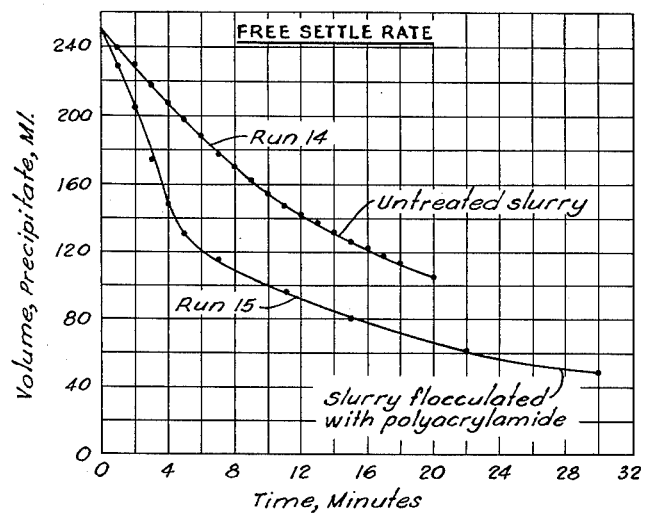

April 10, 1962  R. D. GOODENOUGH  3,029,133
METHOD OF PRODUCING STRONTIUM CARBONATE AND
STRONTIUM SULFATE FROM BRINES CONTAINING
CALCIUM AND STRONTIUM HALIDES
Filed Jan. 22, 1959

INVENTOR.
Robert D. Goodenough
BY
C.W. Carlin
ATTORNEY

United States Patent Office 3,029,133
Patented Apr. 10, 1962

3,029,133
METHOD OF PRODUCING STRONTIUM CARBONATE AND STRONTIUM SULFATE FROM BRINES CONTAINING CALCIUM AND STRONTIUM HALIDES
Robert D. Goodenough, Midland, Mich., assignor to The Dow Chemical Company, Midland, Mich., a corporation of Delaware
Filed Jan. 22, 1959, Ser. No. 788,378
8 Claims. (Cl. 23—66)

The invention relates to the production of strontium compounds from brine containing dissolved strontium salts and especially to the production of high purity strontium sulfate or high purity strontium carbonate from brines which also contain dissolved calcium salts.

Brines containing both calcium and strontium salts have resisted removal therefrom of the strontium values by any known method which is sufficiently simple and expedient to make it practical. Selective crystallization under controlled conditions of concentration and temperature has been employed with some success but is too tedious to be accepted commercially. U.S. Patent 1,831,251 describes a method of recovering strontium chloride from mixed solutions containing such salts as the chlorides of sodium, calcium and magnesium by concentrating the solution to a gravity of between 48° and 49° Baumé at a temperature of 46° C. to remove $MgCl_2$ and NaCl and cooling the thus concentrated solution to about 310 C. or just short of the saturation point of $CaCl_2$, while agitating, to crystallize $SrCl_2$ together with some $CaCl_2$, and thereafter separating the $SrCl_2$ from the $CaCl_2$ by partially melting the crystals and removing a portion of the thus-liquefied $CaCl_2$. The over-all recovery of strontium values employed in the above method has been too low for commercial acceptance.

Despite the serious disadvantage of the method above briefly described, no method has been devised during the intervening years between the issuance of the said patent and the present time which has resulted in its acceptance commercially.

A method of recovering strontium values from brines containing strontium salts and particularly from mixed brines containing also calcium salts has, therefore, been a desideratum over the years. Accordingly, the main object of the invention is to provide a method which meets the requirements of such desideratum. The way by which the invention attains this and related objects is hereinafter fully described and is particularly pointed out in the claims.

Briefly the invention consists of converting the strontium values in a calcium halide-containing brine, having a molar ratio of calcium to strontium of not over 20 to 1 and preferably not over 7:1, to the sulfate by admixing therewith a water-soluble sulfate under specified conditions, settling out and recovering the strontium sulfate thus produced together with some contaminating sulfates, leaching out a substantial portion of the contaminating sulfates with a mineral acid, and, if desired, washing and drying the thus purified strontium sulfate so produced. The strontium sulfate thus produced is of fine particle size and contains no detectable barium in contrast to available strontium sulfate produced by conventional methods.

A particularly useful embodiment of the invention is to admix an aqueous solution of a soluble carbonate with the washed acid-leached sulfate in accordance with the conditions set out hereinafter to produce high purity $SrCO_3$.

The invention offers a simple and efficient method of producing high purity $SrSO_4$ and other strontium compounds producible by subsequent reactions with the $SrSO_4$ employing reactants which may be largely waste products of other manufacturing processes. The strontium values recovered according to the invention are those contained in by-product brine, which has been processed to obtain alkali metal salts and alkaline earth metal salts other than those of strontium. The sulfate used may conveniently be by-product waste material produced in the manufacture of Epsom salt. When $SrCO_3$ is desired the carbonating reagent employed may be the reaction product produced when by-product caustic solution from chlorine cells is reacted with $CO_2$ from smoke stacks.

FIGURE 1, annexed hereto, graphically shows settling rates of $SrSO_4$ from the reaction mixture in the practice of the invention.

Figure 2:
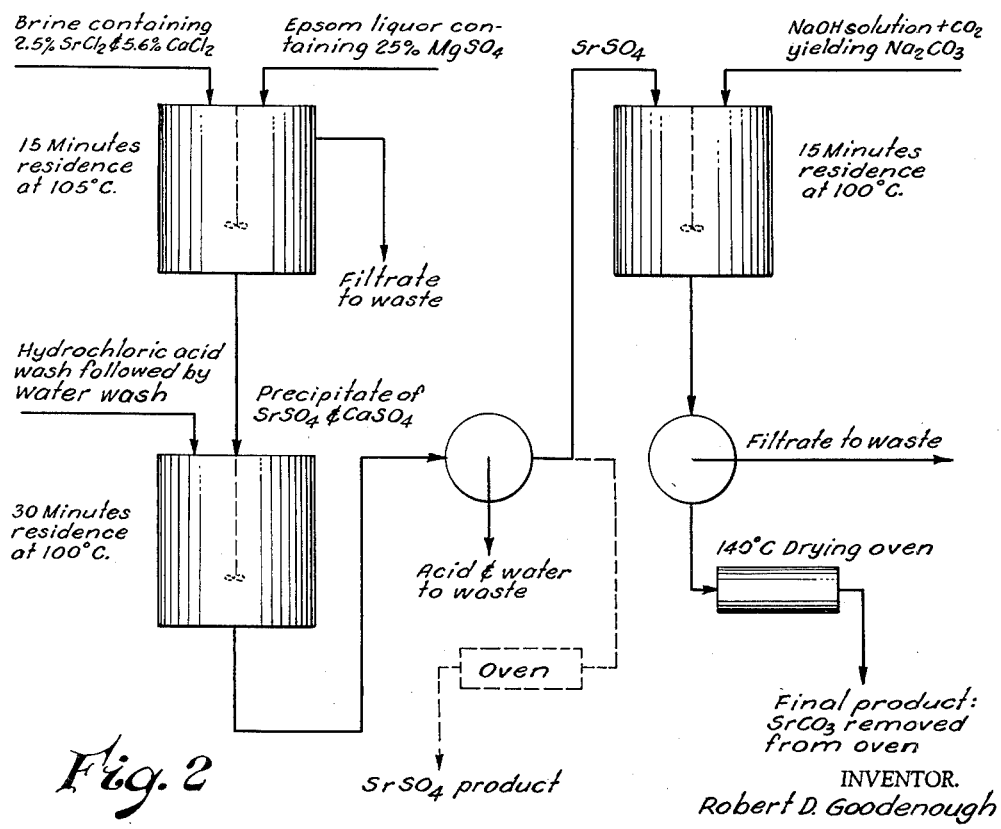

FIGURE 2 schematically delineates the method of practicing the invention by means of a flow sheet wherein specific amounts of reactants are employed to produce $SrSO_4$ or by treatment with a soluble carbonate to produce $SrCO_3$.

In the practice of the invention a solution of a soluble sulfate, e.g., $MgSO_4$, and a brine which contains strontium salt, usually largely the chloride, are admixed and heated at between 50° and 110° C. for from 0.5 to 60 minutes, or longer, if desired. The preferred heating period is 15 minutes. The preferred temperature during the heating period is between 90° and 110° C. and the temperature range especially recommended is between 96° and 109° C. The reaction mixture of brine and soluble sulfate is then filtered to separate the impure $SrSO_4$ thus formed which is then leached with a mineral acid, preferably in an amount between 5 and 40 percent by weight of a 0.1 to 1.0 normal hydrochloric acid.

The weight percent of the ($SO_4$) portion of the soluble sulfate added to the Sr values contained in the brine is between 50 and 133.5 percent of the stoichiometric quantity of ($SO_4$) required to react with the Sr as illustrated by the following equations:

(1) 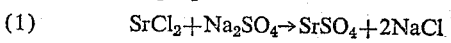
$$SrCl_2 + Na_2SO_4 \rightarrow SrSO_4 + 2NaCl$$

or (2) 
$$SrCl_2 + MgSO_4 \rightarrow SrSO_4 + MgCl_2$$

The recommended percent of the ($SO_4$) to employ is between 85 and 115 percent and preferably between 100 and 110 percent of that required to react with the strontium, illustrated by the above equations or, since the molecular weight of ($SO_4$) is 96 and the atomic weight of Sr is 87.63, the preferred range is between 96.0 and 105.6 weight units of ($SO_4$) to 87.63 weight units of Sr. In a continuous operation it has been found advantageous to admix the acid and reaction mixture containing the $SrSO_4$ in suspension in a mixing chamber prior to precipitation. The mixing chamber may be at room temperature or at an advanced temperature up to 100° C. The dwell time in the mixing chamber is not highly critical but is usually 15 to 30 minutes.

When the $SrSO_4$ produced as described above is converted to $SrCO_3$, the temperature of the reaction wherein the soluble carbonate is admixed with the $SrSO_4$ is between 25° and 110° C. with a preferred temperature range of between 90° and 100° C. The period of time allowed for the reaction may be anywhere up to 60 minutes, or longer if desired, but is usually about 30 minutes.

The ($CO_3$) portion provided by the soluble carbonate, e.g., $Na_2CO_3$, is 90 to 130 percent of the stoichiometric quantity required to react with the Sr as illustrated by the following equation:

(2) 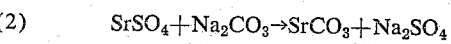
$$SrSO_4 + Na_2CO_3 \rightarrow SrCO_3 + Na_2SO_4$$

A carbonate is usually employed in an amount between 110 and 130 percent of the stoichiometric quantity required to react with the Sr or between 66.6 and 78 weight units of (CO₃) to 87.63 weight units of Sr.

Test runs and examples appear hereinafter to illustrate the practice of the invention.

The brine employed in all the examples set out hereinafter, was leachate brine produced in the process of recovering other salts from an inland brine. The leachate brine was produced as a by-product as follows:

An inland brine was evaporated in an evaporator to the point at which most of the NaCl crystallized out of solution. The mother liquor thus produced, designated mother liquor No. 1, had the specific gravity and contained the salts, for which an analysis was run, under Brine Analysis below.

Mother liquor No. 1 was further evaporated and then desalted and cooled to 70° C. at which some tachydrite, which is $2MgCl_2 \cdot CaCl_2 \cdot 12H_2O$, crystallized out leaving $SrCl_2$, KCl, and a substantial percentage of the $CaCl_2$ in solution. The specific gravity and percentage of salts for which analyses were run in mother liquor No. 2, are also set out under Brine Analysis below.

Mother liquor No. 2 was then cooled to 28.5° C. at which temperature carnallite, which is $KCl \cdot MgCl_2 \cdot 6H_2O$, crystallized out with a substantial portion of the $SrCl_2$. Carnallite crystallizes out to some extent between 93° and 0° C., but for practical purposes, the range may be said to be between 65° and 25° C. The recommended range for crystallizing out the carnallite is below 32° C. for good crystallization action, but above 24.8° C. because below that temperature $CaCl_2 \cdot 6H_2O$ begins to crystallize out.

The carnallite crystals containing the $SrCl_2$ were then washed with water. The water thus employed acquired a certain salt content and is hereinafter referred to as leachate or leachate brine. The specific gravity and the salt contained therein, for which analyses were run, is set out under leachate brine below. A portion of the leachate is recycled back into the process, but a substantial portion thereof, heretofore largely wasted, was employed herein as the brine source of strontium for the preparation of $SrSO_4$ according to the invention. It had a calcium to strontium molar ratio of 2.7:1.

BRINE ANALYSIS

|  | Mother Liquor No. 1 | Mother Liquor No. 2 | Leachate Brine |
| --- | --- | --- | --- |
| Specific Gravity | 1.411 at 95° C. | 1.485 at 70° C. | 1.265 at 30° C. |
| CaCl₂ | 34.88 | 38.92 | 3.65 |
| MgCl₂ | 6.02 | 7.96 | 17.05 |
| KCl | 2.53 | 3.33 | 5.07 |
| NaCl | 1.25 | 0.85 | 2.31 |
| SrCl₂ | 0.75 | 0.90 estimated | 1.95 |

To show the effect of admixing an aqueous solution of a sulfate to the brine described above, in accordance with the first step of the invention, viz. admixing an aqueous solution of a sulfate with a Sr-containing brine which also contained calcium ions, a series of runs were made wherein the sulfate compound employed and the ratio of sulfate to the brine were varied.

The runs were conducted by placing 200 ml. of the brine in an extraction flask provided with a heater and a stirrer. The brine was heated to between 95° and 109° C. A near-saturated aqueous solution of $Na_2SO_4$ was then added in an amount sufficient to provide the quantity of $Na_2SO_4$ set out in Table I below, except in run 4 wherein $H_2SO_4$ was used. The resulting mixture was digested for 15 minutes. The results are set out in Table I.

Table I

| Run No. | 1 | 2 | 3 | 4 |
| --- | --- | --- | --- | --- |
| Brine in ml | 200 | 200 | 200 | 200 |
| Na₂SO₄ in gm | 3.76 | 4.42 | 5.08 | |
| H₂SO₄, 6N in ml | | | | 10.35 |
| Stoichiometric¹ quantity of (SO₄) required in percent | 85 | 100 | 115 | 100 |
| Sr recovered as percent of theoretical | 75.3 | 85.9 | 94.8 | 78.7 |
| SrSO₄ recovered in gm | 4.30 | 4.89 | 5.42 | 4.50 |
| CaSO₄ recovered in gm | 0.37 | 0.48 | 0.53 | 0.50 |
| SrSO₄ as percent of total sulfates in precipitate | 92.1 | 91.1 | 91.1 | 90.1 |

¹ As calculated on SrCl₂ in brine according to Equation (1), supra. Traces of Fe compounds due to contamination were also present in the precipitate.

The strontium sulfate and calcium sulfate values set out in Table I were obtained by collecting the mixed sulfate precipitate on a filter paper, washing, and converting the sulfates to the respective carbonates by admixture with an aqueous solution of $Na_2CO_3$ to precipitate $SrCO_3$, and thereafter recovering the precipitate by filtration and washing the thus recovered precipitate. The washed $SrCO_3$ precipitate was then analyzed by dissolving it in hydrochloric acid. The alkaline earth metals were determined by flame spectrophotometry. Residual strontium values in the filtrate were also determined and when added to the strontium values in the precipitate gave about 100 percent. When run 4 is compared to run 2 of the above table (both employing 100 percent of the stoichiometric quantities) it is seen that the sulfate provided by sodium sulfate gives an improved yield over that obtained when sulfuric acid is employed. Table I also shows that when 100 percent, and particularly when 115 percent of the stoichiometric amount of the $SO_4$ portion of the sulfate required to react with the strontium is employed, the results are considerably better than when less than the stoichiometric quantity is employed. For example the percentage of strontium values recovered, when the sulfate is employed in an amount based on 115 percent of the stoichiometric quantity required, was 94.8 percent as contrasted to a percentage of 75.3 percent when only 85 percent of the stoichiometric quantity of sulfate was used. The table also shows that the percentage of calcium sulfate present in the precipitate is little changed by variation in ratio of the Sr salt and soluble sulfate employed in the reactions.

A second series of tests was then run to show the effect of variations in the digestion heating period of the soluble sulfate and the brine employed in the first step of the invention. The same apparatus, method, conditions, and quantities were employed as in run 2 of the first series of runs except the heating period was varied to include a shorter period of five minutes and a longer period of sixty minutes. Run 6 of this series is run 2 of Table I which is repeated for ease of comparison. The results are shown in Table II below.

Table II

| Run No. | 5 | 6 | 7 |
| --- | --- | --- | --- |
| Time in Min | 5 | 15 | 60 |
| Sr recovered in percent of theoretical | 80.8 | 85.9 | 83.3 |
| SrSO₄ in gm. in ppt | 4.62 | 4.89 | 4.75 |
| CaSO₄ in gm. in ppt | 0.44 | 0.48 | 0.53 |
| SrSO₄ in percent of total sulfates in ppt | 91.2 | 91.1 | 89.8 |

Traces of Fe compounds due to contamination were also present in the precipitate. A study of the results of Table II shows that a 15 minute heating period gives the highest strontium recovery expressed in the percentage of that possible and is not accompanied by an appreciable decrease in the percentage of $SrSO_4$ in the recovered precipitate. Nothing appears to be gained by prolonging the period of heating beyond 15 minutes, but on the contrary, there is an indication that the percentage of calcium sulfate in the recovered product is increased by prolonged heating. The relatively short heating period of about 15 minutes shows that a fairly high through-put of brine may be attained without employing a large mixing tank for the heating step.

A third series of tests designated runs 8 and 9, was made to evaluate the effect of temperature on the rate of precipitation of the strontium sulfate in the first step of the invention. The same apparatus, method, conditions, and quantities were employed in this series of runs as in runs 2 and 6 above except that the temperature during the heating period was varied. Run 10 is the same as runs 2 and 6 and the results are repeated in Table III for convenience. The results are shown in Table III below:

*Table III*

| Run No. | 8 | 9 | 10 |
|---|---|---|---|
| Temperature in °C | 23–26 | 63–66 | 96–103 |
| Sr recovery in percent | 53.8 | 67.2 | 85.9 |
| SrSO$_4$ recovered in gm | 3.01 | 3.86 | 4.39 |
| CaSO$_4$ recovered in gm | 1.30 | 0.59 | 0.48 |
| SrSO$_4$ recovered in percent | 69.8 | 86.8 | 91.1 |

Traces of Fe compounds due to contamination were also present in the precipitate.

The product produced by precipitation was measured at the end of the 15 minute period at the temperatures set out in Table III. The results of the table definitely show that the high temperature range of 96° to 103° C. resulted in a more rapid settling of the strontium sulfate produced and in a higher percentage recovery of strontium sulfate.

The effect of variable amounts of calcium values in the brine employed in the first step of the invention was investigated in a fourth series of tests. This series, designated runs 11, 12, and 13, was conducted by first adding weighed portions of anhydrous reagent-grade calcium chloride to three samples of the brine described above. By reagent grade is meant one of satisfactory purity for preparing standard solutions in laboratory work as defined in the literature of the manufacturers of chemical compounds. The weighed portions of the brine were transferred to extraction flasks provided with heating and stirring means. To each flask was added a sufficient amount of a 25 percent by weight reagent grade magnesium sulfate aqueous solution to provide the stoichiometric quantity thereof necessary to react with the strontium chloride present in accordance with the Equation 2, supra. The magnesium sulfate solution and the strontium chloride brine were heated for a period of 15 minutes at a temperature of between 106° and 111° C. The quantities of brine, the percentage of CaCl$_2$ and SrCl$_2$ in the brine, the molar ratio of calcium to strontium, the amount of MgSO$_4$·7H$_2$O added, and the yield are set forth in Table IV which follows:

*Table IV*

| Run No. | 11 | 12 | 13 |
|---|---|---|---|
| Brine in gm | 251.6 | 255.1 | 254.7 |
| SrCl$_2$ in percent | 2.05 | 1.98 | 1.94 |
| CaCl$_2$ in percent | 3.43 | 5.63 | 7.44 |
| Mole ratio of Ca:Sr | 2.4:1 | 4.1:1 | 6.1:1 |
| MgSO$_4$·7H$_2$O in gm | 8.02 | 7.86 | 7.69 |
| Sr recovery in percent | 85.2 | 81.6 | 70.5 |
| SrSO$_4$ in gm | 5.09 | 4.76 | 4.04 |
| CaSO$_4$ in gm | 0.57 | 0.74 | 0.84 |
| SrSO$_4$ in percent of ppt | 90.5 | 86.7 | 82.7 |

Traces of Fe compounds due to contamination were also present in the precipitate.

The results of this series of tests on the production of unrefined SrSO$_4$ in accordance with the first step of the invention are the basis for the following conclusions: (1) an increase in the calcium to strontium mole ratio tends to decrease the percentage yield of SrSO$_4$; (2) the mixed sulfate precipitate contains a lesser percent of SrSO$_4$ when the percent of CaCl$_2$ in the brine is increased; (3) MgSO$_4$·7H$_2$O in an aqueous solution is as effective a precipitant as an aqueous solution of Na$_2$SO$_4$. It is to be noted that the percent of CaCl$_2$ in the brine employed in run 13 set out in Table IV is considerably higher than that ordinarily encountered in brines from which strontium values are sought to be obtained. The brines employed usually have had a substantial percent of the calcium values removed prior to the removal of the strontium values therefrom and usually the calcium to strontium ratio in such brines is within a range of between about 3.85 to 1 and about 4.81 to 1. To illustrate, in 87 samples of brine treated in accordance with the invention for the removal of strontium values therefrom, no sample of brine was found which exceeded a ratio of 4.1 to 1 and the average of the 87 samples was 3.2 moles of calcium to 1 mole of strontium.

A fifth series consisting of runs 14 and 15 was made for the purpose of determining the settling rate of strontium sulfate precipitate produced in the production of unrefined SrSO$_4$ in accordance with the first step of the invention. This series of tests employed a MgSO$_4$ solution and a brine having substantially the analysis of that used in the series of Tables I and II except that the SrCl$_2$ content was 1.86 percent, which was slightly lower than the above analyzed brine. The runs were conducted by placing 3536 grams of the brine in a stainless steel container and heating it to 106° C. To the heated brine was then added an aqueous solution containing 102.5 grams of MgSO$_4$·7H$_2$O. The resulting slurry of brine and MgSO$_4$ was heated for 15 minutes to precipitate SrSO$_3$. The slurry was divided into two portions. One portion of the slurry was then transferred from the container to a glass stoppered 250 ml. cylindrical graduate and designated run 14. The graduate was inverted several times so as to render the slurry uniform and then placed in an upright position in an oven equipped with a timer and a temperature control set at 105° C. without further treatment. The timer was started at the time that the slurry was placed in the oven and the rate of settling of the precipitate timed by periodically reading the volume occupied by the precipitate. The readings obtained are those designated by the dots on the curve 14 in FIGURE 1.

The second portion, designated run 15, consisted of 250 milliliters of the brine-sulfate slurry. To this second portion were added 2 milliliters of a 0.1 percent aqueous solution of polyacrylamide and the thus-treated slurry transferred to a graduate and placed in the 105° oven. The rate of settling was timed in the 105° C. oven as in run 14. The settling rate of run 15 is set out as curve 15 in FIG. 1. An examination of the curves 14 and 15 shows that the maximum settling rate of the untreated slurry was 2.8 feet per hour whereas the settling rate of the slurry containing the polyacrylamide was 4.6 feet per hour.

As can be observed by referring to Tables I to IV above, the sulfate precipitate contained appreciable amounts of calcium sulfate. A small percentage of iron, chiefly as iron oxide, was also present in the sulfate product produced which came largely from the interior of pipes and transfer lines. To reduce the iron content to a negligible amount and to reduce the calcium content by at least 50 percent in accordance with the invention, the strontium sulfate product is leached with dilute hydrochloric acid. The strength of the acid employed may be varied, between 0.1 and 1.0 N, about 0.5 N usually being employed.

The practice of the invention will be made more clear by a study of the following examples which illustrate the complete method of the invention:

EXAMPLE 1

400 milliliters of a brine containing dissolved strontium salts together with other soluble salts were heated to 105°. To the heated brine were added 40 milliliters of a magnesium sulfate solution consisting of 190 grams of $MgSO_4.7H_2O$ in 1 liter of solution. The brine-$MgSO_4$ slurry was heated for a 15 minute period during which the insoluble sulfates formed and were precipitated. The sulfate precipitate was then separated by passing the slurry through a Buchner funnel. The precipitate was washed with 200 milliliters of water. An acid wash was then prepared which consisted of 0.5 normal hydrochloric acid containing 0.57 percent (by weight of the acid) of $SrCl_2$. The $SrCl_2$ was added to the acid wash to react with an estimated 10 percent calcium sulfate contained in the crude sulfate precipitate. The sulfate precipitate was then leached with 200 milliliters of the acid solution containing the added $SrCl_2$ at room temeprature and then water-rinsed.

The resulting rinsed acid-leached sulfate precipitate was then treated with 120 grams of an aqueous solution consisting essentially of 6.87 percent $Na_2CO_3$, 1.47 percent $NaHCO_3$ and 15.6 percent NaCl to produce a precipitate of $SrCO_3$. The treating agent for the preparation of the strontium carbonate might very well have consisted of an aqueous solution of $Na_2CO_3$ only but the treating agent here employed was conveniently and economically prepared by carbonating an effluent caustic liquor with $CO_2$ which had been removed from smoke stack gases. The resulting strontium carbonate precipitate was water-washed and dried and thereafter analyzed for the following ingredients which were found to be present in the amounts set out below:

1.09 percent $CaCO_3$
2.38 percent $Na_2CO_3$
0.01 percent total of K, Li and Mg
No Ba was detectable
96.5 percent (balance), essentially $SrCO_3$.

The above analysis shows that this product is of substantially higher purity than commercial technical grade strontium carbonate which contains about 92 percent $SrCO_3$ and up to 6 percent total of barium carbonate and calcium carbonate.

Additional examples, designated Examples 2, 3, and 4 were then run using different concentrations of sodium carbonate solution to prepare $SrCO_3$ in accordance with that embodiment of the invention. The sulfate employed in this series of tests contained 94.8 percent $SrCO_4$ and 3.9 percent $CaSO_4$. Sodium hydroxide solution, carbonated with $CO_2$ to produce the varbonated solution employed in Example 1 above, was admixed with the acid-leached sulfate in varying amounts. The carbonated solution contained from 72 percent to 104 percent of the stoichiometric quantity of ($CO_3$) required to react with the Sr values of the sulfates present.

Table V below sets out the results of this series of tests.

Table V

| Example No. | 2 | 3 | 4 |
| --- | --- | --- | --- |
| $SrSO_4$ in gm | 10.01 | 10.01 | 10.02 |
| Carbonated solution in gm | 72 | 88 | 104 |
| Percent [1] of stoichiometric | 90 | 110 | 130 |
| $Na_2CO_3$ remaining, in percent | 1.0 | 5.1 | 18.3 |
| $NaHCO_3$ remaining, in percent | 57 | 97 | 95 |
| $Na_2CO_3$, in percent, in $SrCO_3$ ppt | 1.84 | 1.87 | 2.03 |
| $CaCO_3$, in percent, in $SrCO_3$ ppt | 4.57 | 4.62 | 4.61 |
| Acid-insolubles,[2] in percent | 14.9 | 3.7 | 1.1 |

[1] Percentage is based on stoichiometric quantity of carbonate necessary to react with the sulfate.
[2] Acid insolubles were determined according to a method set out in Official Method of Analysis, published by the Foote Mineral Company. The value represents the sulfate content of strontium carbonate which is insoluble in mildly acidic water-methanol solution. Both strontium and calcium sulfates contribute to the insoluble material. An acid insoluble content of 1.5 percent is considered acceptable for commercial strontium carbonate.

An examination of Table V shows that the carbonate content of the liquor is consumed in preference to the bicarbonate content. It is recommended, therefore, that before use, the above carbonated solution be admixed with caustic soda solution in sufficient amount to convert the bicarbonate to carbonate.

EXAMPLE 5

22,500 grams of brine containing 2.52 percent strontium chloride and other chlorides, e.g., $MgCl_2$, $CaCl_2$, KCl and NaCl, in similar proportions to those in the brines employed above, were added to 1945 grams of an Epsom salt liquor containing 28.6 percent $MgSo_4$ (which constituted 33.5 percent excess of stoichiometric quantity required by Equation 2, supra) in a reaction vessel and heated at 93.5° C. for 15 minutes. Thereafter, the slurry thus produced was transferred to a graduated cylindrical vessel and the rate of settling of the sulfate precipitate was measured and found to be between 3 and 3.5 feet per hour. The precipitate was then separated by filtering in a Buchner funnel and the resulting sulfate precipitate washed with 1000 milliliters of water at 25° C. The filtrate which was drawn off contained 0.14 percent $SrCl_2$ showing a 93.7 percent recovery of the strontium values in the precipitate.

An analysis for sulfates in the precipitate showed it to contain 80.60 percent $SrSO_4$ and 18.5 percent $CaSO_4.2H_2O$. By heating to dryness at 110° C., the wet precipitate was shown to consist of 54 percent solids.

574 grams of the sulfate precipitate thus produced was leached with 1625 milliliters of 0.5 N hydrochloric acid to which had been admixed 180 grams of $SrCl_2.7H_2O$ which was 10 percent over the strontium values already present and was an amount about equivalent to the Ca content. The reason for adding the $SrCl_2$ is the same as that given in Example 1. The resulting precipitate was then washed with 700 milliliters of wash water at 25° C.

The washed $SrSO_4$ precipitate thus purified by the acid-$SrCl_2$ solution treatment contained 69.4 percent solids (as determined by drying at between 130 and 140° C.). An analysis of the cake (dried solids) thus produced showed it to consist of 99.0 percent $SrSO_4$ and 1 percent $CaSO_4$. The strontium sulfate precipitate thus obtained was then carbonated by admixing 342 grams thereof with 3570 grams of a carbonating liquid consisting of 6.87 percent $Na_2CO_3$, 1.47 percent $NaHCO_3$, and 15.6 percent NaCl and digesting for one hour at 100° C. A strontium carbonate precipitate was thus produced which was separated from the solution by filtration. Total solids of the precipitate when dried at 130° C. to 140° C. were about 60.7 percent. An analysis of the resulting strontium carbonate precipitate showed it to contain 1.03 percent $CaCO_3$
2.69 percent $Na_2CO_3$
0.006 percent Cl
80 p.p.m. Fe
2.93 percent ($SO_4$) analyzed as $SrSO_4$ $$96.4 - \left(2.93 \times \frac{147.6}{158.5}\right)$$

or 93.68 percent $SrCO_3$

EXAMPLE 6

4534 grams of brine containing 2.63 percent $SrCl_2$ intermixed with other salts, e.g., KCl, $MgCl_2$, NaCl and $CaCl_2$, in similar proportions to those in the brine employed in the other examples, were placed in a steel reaction vessel and heated to between 60° and 70° C. To the heated brine were admixed 5 milliliters of 0.1 percent polyacrylamide. Some $Fe_2O_3$ flocculated and was filtered off. Thereafter 99.8 grams of an aqueous solution consisting of 28.6 percent magnesium sulfate, which was 10 percent in excess of the stoichiometric amount required to react with the strontium values present to form $SrSO_4$ were added thereto and the resulting mixture digested for 20 minutes at between 103° and 104° C. to precipitate the sulfates. Thereafter the sulfates thus precipitated were separated by filtration and washed with 500 milliliters of wash water at 25° C.

The filtered precipitate thus produced was analyzed and found to contain 92.2 percent $SrSO_4$ and 9.1 percent $CaSO_4$. 127 grams of the sulfates thus prepared were digested with 400 milliliters of 0.5 N hydrochloric acid for 30 minutes at 100° C. The acid filtrate was found to contain 3.96 grams of calcium sulfate showing a 34 percent removal of the calcium sulfate. The resulting precipitate was carbonated by admixing therewith 685 milliliters of a carbonated aqueous liquid, having a gravity of 1.145, consisting of 19.2 grams of NaCl, 139.0 grams of $Na_2CO_3$ and 4.6 grams of NaOH and the balance water per liter. The mixture was digested at 100° C. for 30 minutes. Carbonates consisting chiefly of $SrCO_3$ were thereby precipitated.

The carbonates thus produced by the above carbonation were dried at 130° C. and found to consist of 58.5 percent solids. The solids were analyzed and found to contain:

4.17 percent $CaCO_3$
    1.59 percent $Na_2CO_3$
    1.38 percent acid insolubles $$94.2 - \left(1.38 \times \frac{147.6}{158.5}\right)$$

or 92.92 percent $SrCO_3$.

Other materials were present in a total amount not over 1 percent by weight.

An evaluation of the examples shows that it is desirable to have present an excess of the magnesium sulfate over that required to react with the Sr salt in the brine. The examples show that best results are obtained by having a relatively high concentration of sodium carbonate in a carbonating solution. They also show that substantially all the sodium sulfate should be removed otherwise the acid insoluble impurities are too high as shown in Example 2.

The practice of the invention for the production of strontium compounds from strontium salt-containing brines in contrast to the existing practice of obtaining strontium from ores provides a number of advantages. Among such advantages are: (1) obviating the use of strontium ores, e.g., celestite, which are largely imported from abroad thereby entailing especially high shipping costs in addition to the considerable cost of mining, crushing, and refining; (2) obtaining strontium compounds having substantially lower barium contamination than those obtained by known methods, which is a decided advantage because strontium compounds containing barium are not suitable for a number of purposes, e.g., pharmaceuticals where the barium has undesirable physiological effects, and in flares and pyrotechnics where the presence of the green color produced by the barium obscures the desired red color of the strontium; (3) strontium sulfate obtained according to the invention is of a fine particle consistency whereas that obtained from ores is quite coarse and not satisfactory for the preparation of carbonates therefrom without preparatory treatment including grinding, and even after such treatment is less desirable and produces a $SrCO_3$ product of inferior quality to that of the invention.

The practice of the invention has especially important economic aspects, because (1) the strontium-containing brine, (2) one of the most effective precipitants, viz., $MgSO_4$ liquor, and, when converted to $SrCO_3$, (3) the $CO_2$ and caustic effluent liquor, are all by-products of other chemical operations.

Having described the invention, what is claimed and desired to be protected by Letters Patent is:

1. The method of producing finely divided strontium sulfate of high purity from a brine containing halide salts of calcium and strontium in solution, said halide salts being selected from the group consisting of bromides, chlorides, iodides, and mixtures thereof, wherein objectionable quantities of the calcium halides are present but the molar ratio of calcium to strontium therein does not exceed 20, which consists of admixing with said brine an aqueous solution of a water-soluble sulfate in sufficient quantity to provide between 50 and 133.5 percent of the stoichiometric quantity required to react with the strontium values present, digesting the resulting mixture at a temperature of between 50° and 110° C. for a period of between 0.5 and 60 minutes to precipitate the sulfates comprising $SrSO_4$, separating and water-washing said sulfates, leaching the washed precipitate with between 5 and 40 percent by weight of a 0.1 to 1.0 N hydrochloric acid at about room temperature to leach out a substantial portion of contaminating sulfates.

2. The method of producing finely divided strontium sulfate from a brine containing halide salts in solution selected from the group consisting of bromides, chlorides, and iodides of calcium and strontium wherein the molar ratio of calcium to strontium is not over 20, which consists of admixing therewith an aqueous solution of a water-soluble sulfate selected from the group consisting of sodium sulfate, magnesium sulfate, and sulfuric acid, in an amount sufficient to provide between 85 and 110 percent of the stoichiometric quantity required to react with the strontium values present in the brine at a temperature of between 90° and 110° C. for about 15 minutes to precipitate crude $SrSO_4$, separating and water-washing the precipitate thus formed, leaching the washed precipitate with a 0.1 to 1.0 N hydrochloric acid in an amount of at least 0.5 times the weight of the precipitate for a period of at least 15 minutes at a temperature of between 50° and 100° C., and water-washing the acid-treated precipitate.

3. The method according to claim 2 wherein the addition of hydrochloric acid is accompanied by the addition of a water-soluble strontium compound in an amount of at least 10 percent in excess of the stoichiometric quantity required to react with the calcium component of any calcium compound present in the precipitate.

4. The method of producing finely divided strontium carbonate of low barium contamination from a brine containing halides in solution including those selected from the group consisting of bromides, chlorides, and iodides of strontium and calcium wherein the molar ratio of Ca to Sr is not over 7 which consists of admixing therewith an aqueous solution of a water-soluble sulfate selected from the group consisting of sodium sulfate, magnesium sulfate, and sulfuric acid, at a temperature of between 96° and 109° C. for between 5 and 15 minutes to precipitate crude strontium sulfate contaminated with calcium, separating and water washing the precipitate thus formed, leaching the washed precipitate with 0.1 to 1.0 N hydrochloric acid containing at least the stoichiometric quantity of a strontium halide selected from the class consisting of the chloride, bromide, and iodide thereof, in sufficient amount to provide strontium ions to replace the calcium of any calcium compound present, the amount of said acid being sufficient to form a slurry of the precipitate, digesting said precipitate in said acid solution for at least 15 minutes at a temperature of between 50° and 100° C., water-washing the acid-treated precipitate, admixing with said precipitate an aqueous solution of a carbonate capable of yielding carbonate radicals in solution in an amount of between 90 and 130 percent of the stoichiometric quantity required to react with the strontium values, digesting the resulting mixture for from 0.5 to 60 minutes at a temperature between 25° and 110° C. to precipitate $SrCO_3$, and filtering out and water-washing the precipitate thus formed.

5. The method of claim 2, wherein the aqueous solution of a sulfate is a solution containing at least 25 percent by weight of a magnesium sulfate.

6. The method according to claim 2, wherein the aqueous solution of a sulfate is sulfuric acid of a normality of between 2 and 10.

7. The method according to claim 3, wherein the strontium salt is an aqueous solution of $SrCl_2$.

8. A method according to claim 4, wherein an aqueous solution of $Na_2CO_3$ is employed as the source of the carbonate radicals in an amount sufficient to yield between 110 and 130 percent of the stoichiometric quantity required to react with the strontium values, the digestion period of the admixture of sulfate precipitate and added carbonate is between 15 and 30 minutes, and the temperature of the admixture during the digestion period is between 90° and 110° C.

References Cited in the file of this patent

UNITED STATES PATENTS 2,764,472    Cady et al. _____ Sept. 25, 1956

FOREIGN PATENTS 3,609 of 1882    Great Britain _____ July 29, 1882

OTHER REFERENCES

Mellor: "A Comprehensive Treatise on Inorganic and Theoretical Chemistry," Longmans, Green and Co., N.Y., vol. 3, 1923, page 764.

UNITED STATES PATENT OFFICE
CERTIFICATE OF CORRECTION

Patent No. 3,029,133                                                  April 10, 1962

Robert D. Goodenough

It is hereby certified that error appears in the above numbered patent requiring correction and that the said Letters Patent should read as corrected below.

Column 1, line 28, for "310 C." read -- 31° C. --; column 2, line 69, for "(2)" read -- (3) --; column 10, lines 18 and 19, for "stronium", each occurrence, read -- strontium --.

Signed and sealed this 20th day of November 1962.

(SEAL)

Attest:

ERNEST W. SWIDER
Attesting Officer

DAVID L. LADD
Commissioner of Patents